INVENTOR.
GLENN B. WARREN
BY
Kane, Dalsimer and Kane

ATTORNEYS

March 16, 1965 G. B. WARREN 3,173,409
INTERNAL COMBUSTION ENGINE OPERATING ON STRATIFIED COMBUSTION
PRINCIPLE AND COMBINED FUEL INJECTION AND IGNITING
DEVICE FOR USE THEREWITH
Filed Oct. 23, 1961 2 Sheets-Sheet 2
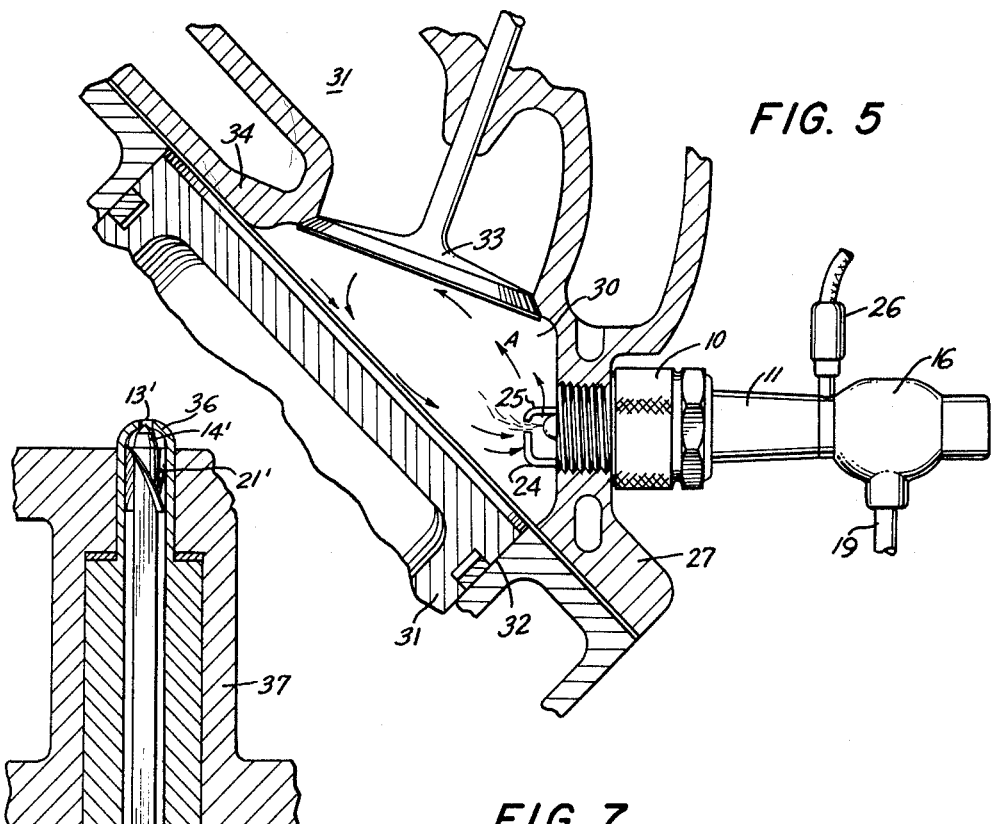
FIG. 5
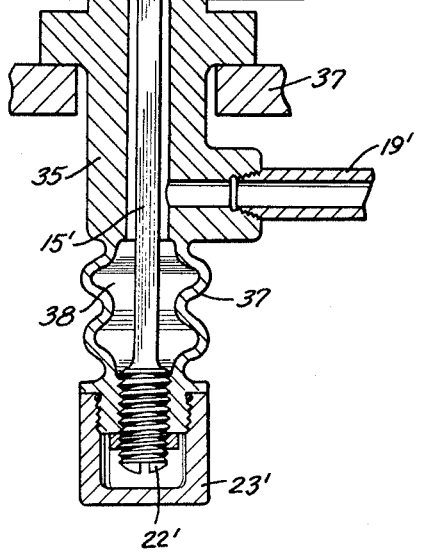
FIG. 6
FIG. 7
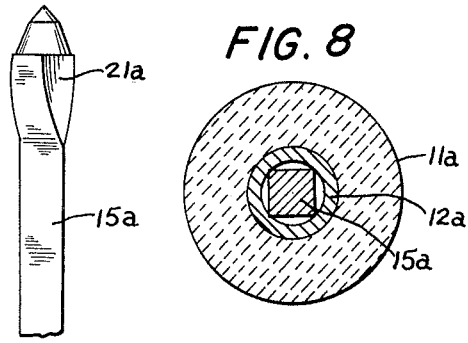
FIG. 8
INVENTOR.
GLENN B. WARREN
BY Kane, Dalsimer and Kane
ATTORNEYS

United States Patent Office 3,173,409
Patented Mar. 16, 1965

3,173,409
INTERNAL COMBUSTION ENGINE OPERATING ON STRATIFIED COMBUSTION PRINCIPLE AND COMBINED FUEL INJECTION AND IGNITING DEVICE FOR USE THEREWITH
Glenn B. Warren, 1361 Myron St., Schenectady, N.Y.
Filed Oct. 23, 1961, Ser. No. 146,736
5 Claims. (Cl. 123—169)

This invention relates generally to internal combustion engines and more particularly to an internal combustion engine operating on the stratified combustion principle.

The thermodynamic cycle upon which an internal combustion engine operates is determined by the design of the engine and the cycle of operation and the engine is selected on the basis of the results desired. The presently used internal combustion engines for the most part fall into three broad categories.

The first category includes engines in which the fuel and combustion air is fed and mixed through a carburetor into and through an inlet manifold and thence into an explosion chamber formed by a piston and a cylinder, and the air fuel mixture to the inlet manifold is throttled for control at the lighter loads on the engine. The compressed mixture within the chamber is ignited by a spark in timed relation with the piston movement. In the second general category fuel is injected into a cylinder at relatively low pressure during the compression or suction stroke or may be injected into the intake manifold in measured amounts. The mixture is spark ignited and load is controlled by combined fuel control and inlet air throttling in order to obtain a proper explosive mixture at the end of the compression stroke at all loads and altitudes. The third general category is direct high pressure fuel injection into the combustion chamber of the engine at the proper point near the top of the piston travel on the compression stroke and ignition is accomplished by the high temperature reached by the air at the end of the compression stroke. The load is controlled by varying the quantity of fuel fed or injected in general without throttling the air inlet.

The first of these categories is embodied in most present automotive gasoline engines which are operated on the so-called Otto cycle. This type of engine can be designed to give high power output without sacrificing engine weight and can be made to respond quickly over a wide speed range. To preclude preignition due to the heat of compression, the compression ratio must generally be less than ten to one, and so-called "high octane fuel" must be used. This engine is inefficient and costly to operate due primarily to the inefficiency of the cycle itself, pumping losses due to throttling at the lighter loads at which the automobile usually operates, cold weather choking, costly anti-knock additives required and generally incomplete burning of the hydrocarbon fuel because of over rich fuel-air mixture inherently required for good operation of such engines. The inefficient operation is coupled with the emission of a high degree of unburned hydrocarbons through the exhaust which creates a health hazard in many locales and which give rise to much of the so-called "smog" problems in certain congested areas.

The second category set forth above is used in many aircraft engines, on some models of the present Mercedes Benz automobile, and other engines with "fuel injection." This category has all of the disadvantages of the first classification plus the fact that there is greater complication in hardware, parts and control. Such operation, however, does avoid a pressure drop through the carburetor and can be made to give ten percent or so greater maximum output for a given size engine, and has some advantages in securing more uniformity in the mixture fed to multi-cylinder automobiles.

The third category which is commonly known as the diesel high pressure fuel injection, compression ignition engine, has been widely and successfully used in trucks, buses and many other applications. For such an engine to ignite its fuel the compression ratio must be about 20 to 1 or more. As a result, this engine is very economical of fuel but is low in power for its weight, limited in top speed, noisy, due to the high pressure injection system, limited in low speed torque and flexibility and rough in operation. Engines falling into this category require fuel having a high "cetane" rating, that is, a fuel which is easily ignitible.

It has long been recognized that if a lower compression engine—10 to 1 with an unthrottled air inlet had a fuel injector similar to a diesel and in addition a spark ignition such an engine might have great advantages and combine many of the advantages of all three classifications of engines above without the disadvantages of any. At full load such an engine would work satisfactorily, but at lighter loads the fuel air mixture would be so lean as to preclude ignition.

Over the past several years engines have been developed to operate as above but on what has been called the "stratified charge" or "stratified combustion" principle. In this at the lighter loads the fuel is mixed with only a part of the air in the combustion chamber and so good combustion is insured. The invention disclosed herein is intended to apply to the type of internal combustion engine which operates on the "stratified combustion" principle and will be described in relation to that category. It is recognized, however, that certain of the teachings herein can be utilized in engines operating on other cycles and the scope of the invention is not restricted to engines operating on the "stratified combustion" principles. I have also included herein a specific design utilizing certain of the teachings of the invention intended for use in an engine operating on a diesel cycle.

In utilizing the "stratified combustion" principle the engine draws in a full unthrottled charge of air as in a diesel. The fuel is then injected at relatively high pressure in an atomized jet at the end of the compression stroke and ignited by a spark almost simultaneously. For full load operation the injection of the fuel must be such that it disburses throughout the combustion chamber quickly and uniformly and mixes with the air to give a complete utilization of the air and hence maximum possible output. It has been found that as stated above engines operating on the spark ignition injection principle work satisfactorily at full load and perform unsatisfactorily at lighter loads without stratification. This is because in an engine designed for good full load operation the mixture is too lean at partial loads to burn properly, resulting in engine misfire or combustion so slow that it is not completed early enough to produce an effective expansion or power stroke. The "stratification" of the mixture needed at the lighter loads may be accomplished in several ways.

For example, it has been known for some time that the inducement of a high speed swirl in the inlet air and around the axis of the cylinder to draw out and stratify or segregate the injected fuel at partial loads in a smaller portion of the air in the chamber will give an ignitible mixture at partial loads. Strategical placing of the spark plug and its timing to ignite this stratified and segregated mixture is required. Excellent light load economy can be obtained by such a design due to the complete burning of the fuel resulting from the excess of air present and the inherently high cycle efficiency of lean mixture operation. Additionally, due to the inherent anti-knock qualities of a stratified mixture with nonburnable gases near the cylinder walls, this type of engine operation has demonstrated an ability to use a wide range of fuels without regard to the anti-knock or "octane" rating and the spark ignition makes it insensitive to the "cetane" rating.

The primary disadvantages of this type of engine operation are relatively high pumping losses due to the swirl that needs to be imparted, lower volumetric efficiency due to imparting the swirl and hence horsepower limitations at high speed. Additionally, with such a design it has been found that major structural modifications must be accomplished in order to alter the presently existing designs of automotive engines so that this operation can be accomplished.

The invention disclosed herein provides a single device for injecting and igniting the fuel so as to operate inherently on the "stratified combustion" principle. The ignition spark is placed physically in front of the injection nozzle a proper distance and the nozzle is provided to give an initial swirl to the fuel as it is injected under high pressure and as the fuel will be atomized or sprayed in a fine mist. The high velocity air swirl or turbulence in the combustion air at the end of the compression stroke induced in most all modern spark ignited automotive engines by the shape of the cylinder head and piston causes the air in the charge to pass across the end of the injector-ignitor at substantially right angles, carries the injected fuel jet with it and will draw it out as a stratified charge. The provision of a high pressure fuel pump for injecting fuel into the several cylinders of the engine in turn and at the proper time so as to synchronize with the spark and the normal amount of air swirl in the combustion chamber at the top of the compression stroke will stretch the injection fuel spray out into a stratified volume which will be ignited by the spark surrounding the outer periphery of the fuel spray in such a way as to be ignited and burned completely. At the time of ignition, however, at such partial loads the fuel will not be mixed with all of the air in the combustion chamber and a relatively rich and ignitable mixture will be present in the vicinity of the ignition spark, thus insuring ignition of the stratified charge. Under this condition of operation and at partial loads a large excess of air would always be available in the cylinder to insure complete combustion and high efficiency operation. At full load operation the injection will continue until sufficient fuel is injected to burn substantially all of the air as the turbulence in the chamber continues the mixing as in a present diesel engine.

Motor cars equipped with this type of engine would not contribute appreciably to the smog forming ingredients in the densely populated urban areas because of the substantially complete burning, due to the excess air present during the greater period of time at which the engine does not operate at full load.

The invention herein disclosed has at its principal object the furnishing of an engine for use in automotive vehicles which will operate satisfactorily throughout its required speed and power range without any substantial throttling of the inlet air at lighter loads by virtue of the stratified combustion principle, and means for economically, quickly and with a minimum of effort, modifying present designs of automotive engines to satisfactorily operate on such a "stratified combustion" principle.

It is possible that in practice some throttling of the inlet air might be desirable at certain periods and under conditions of operations to secure smoother idling, a smoother very low speed operations under load, an engine or braking effect to save the normal brake wear on the vehicle. This will not detract from the basic principle that the bulk of the operations of such an engine will be with an unthrottled air inlet and hence reduction of the "pumping losses" normally associated with the present engines at most operating loads where complete load control is secured by such inlet air or combustible mixture throttling at all times except when the engine is called upon to deliver maximum possible torque.

Another object of this invention is to provide an engine in which substantially all fuel is burned without consideration of octane and cetane numbers, and one which displays good and economical cold-starting and warm-up characteristics.

A further object of this invention is the provision of a combined injector-igniter device for use in an engine operating on the stratified combustion principle.

Another object of this invention is the provision of a combined injector-igniter device for use in an engine operating on the stratified combustion principle which will insure ignition of the fuel substantially on injection and during the complete injection cycle.

Still a further object of the invention is to provide means associated with a combined injector-igniter device as an engine operating on the stratified combustion principle for effecting a swirl and atomization of the fuel as it is injected.

A further object of this invention is to provide an injector device which will be substantially instantaneous in response and which will not stick or leak due to close clearances, pistons, etc., and which will have a low cost of production.

A combined injector-igniter device embodying the invention and the manner of using the same in the operation of an internal combustion engine on the stratified combsution principle is described herein with reference to the drawings, in which:

FIG. 5 is a segmentary cross-sectional view of a cylinder and piston of an engine operating on the stratified combustion principle, equipped with a combined injector-igniter device of the type shown in FIG. 1;

FIG. 6 is an enlarged cross-sectional view of an injector for a compression ignition engine which embodies parts of the invention and is lower in cost and has greater freedom from "sticking" than presently used injector designs;

FIG. 7 is a segmentary view of an alternate stem construction; and

FIG. 8 is a cross-sectional view of the stem shown in FIG. 7 in position within an injector body.

Figure 1:
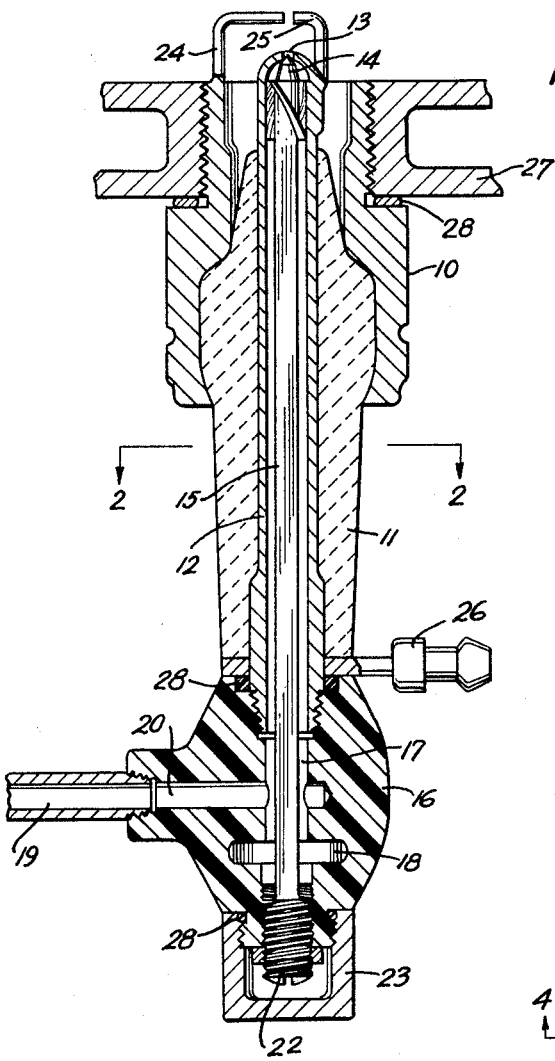
FIG. 1 is an enlarged cross-sectional view of an injector-igniter constructed in accordance with the teachings of this invention.

A combined injector-igniter device embodying the invention is shown in FIG. 1 wherein the numeral 10 indicates the body of the device which is formed of steel and which is similar in configuration to the body of spark plugs presently used. The insulator which is generally formed of porcelain is indicated by the numeral 11 and the central conductor by the numeral 12. The central conductor in the ordinary spark plug available on the market today is a solid member formed of an electrical conductive material. In my combined injector-igniter device the central conductor 12 is also formed of conducting material but is in the form of a hollow tube and is sealed into the porcelain in accord with present approved practice. The tube as shown in FIG. 1 is closed partially at its upper end with an exit hole or orifice 13 provided therein through which it is intended fuel will be injected into a combustion chamber.

Orifice 13 has a small diameter and provides a valve seat receiving valve portion 14 of central valve stem 15 disposed within tube 12. Orifice 13 and valve portion 14 provide a closing seal when the stem 15 is in its uppermost position as shown in FIG. 1 and allows fuel to be emitted through orifice 13 when the stem 15 is in a lowered or withdrawn position.

Member 16 surrounding the tube is formed of plastic. Member 16 is provided with a central bore 17 through which passes the lower end of stem 15 and a transverse annular groove 18 of suitable dimension to perform its function which will be described below is provided.

Stem 15 within tube 12 is formed with a square cross-section and permits fuel which is fed under pressure from nozzle 19 into central bore 17 through transverse bore 20 to pass to the orifice 13. The square stem is provided with fan blades or fins 21 so as to impart a spin to fuel flowing from input 19 through the assembly as it is ejected through orifice 13. Blades 21 give an initial swirl to the fuel charge before it leaves the spray nozzle 13. The lower end of valve stem 15 is carried by adjustment screw 22 to which it is rigidly fastened and cap 23 is provided to cover the adjustment screw.

The spark gap is provided by electrodes 24 and 25 which are brought out in front of orifice 13 so that fuel emitted as a jet from the orifice and mixed with some of the combustion air must pass through the field of the spark gap. Electrode 25 is connected directly to conducting member 12 which, in turn, is electrically connected to terminal 26. Electrode 24 completes the circuit through body 10. The assembly is mounted to engine block 27, as shown, and is provided with suitable sealing rings 28.

Member 16 can be considered a spring member or expandable control member. Chamber 18 is provided therein proportioned in relation to the modulus of elasticity of member 16 so that a predetermined level of pressure within chamber 18 will cause it to become enlarged a predetermined amount in a direction parallel to the longitudinal axis of tube 12. Since the lower end of stem 15 is attached to the lower end of member 16 by means of screw 22, as seen in FIG. 1, such expansion of chamber 18 will cause relative movement of stem 15 and tube 12 and remove valve portion 14 from blocking orifice 13.

With the line 19 attached to a high pressure fuel pump providing injection fuel under pressure to chamber 18 through bore 20, the screw plug 22 will be moved 5 to 10 mils and draw the stem to which it is attached to open the injection orifice 13. This will initiate injection and injection will cease upon closure when the pressure falls beneath a predetermined amount. The valve will open when the injection pressure from the pump rises and close when the injection pressure drops so that the injector will begin its injection sharply and precisely and terminate in the same manner. The adjustment provided by the screw 22 will permit a pre-setting of the pressure at which the valve 14 should open and close.

Member 16 could be formed of metal or some other material rather than plastic performing the same function. If the material used is electrically conductive an insulating conduit or connection would be provided in the fuel line 19.

An injector-igniter as described would be provided with a high pressure fuel pump for injecting fuel into the several cylinders of the engine in turn and at the proper time. The fuel injection would be synchronized with a spark across the gap provided by electrodes 24 and 25. Blades or fins 21 for swirling the fuel stream ahead of the injection hole are provided so as to spread the jet spray out and atomize it as it encounters the spark gap. The combustion air whirl normally provided in the combustion chamber at the top of the compression stroke will stretch the injected fuel spray out into a stratified column which will be ignited by the spark adjacent to the periphery of the fuel spray air mixture in such a way as to be ignited and burned quite completely providing the amount of fuel injected under such circumstances is proportioned so as to meet the needs of the engine and the air available. Under this operation and if the engine is operated at light loads as is intended without throttling of the intake air there would always be a large excess of air made available in the cylinder to ensure complete combustion and high efficiency operation, except at maximum load operation under which conditions the quantities of fuel injected will be limited to what can be burned in the engine without smoking at the exhaust.

In FIG. 5 the injector-igniter is shown in position in the upper portion of the combustion chamber and the numerals used in FIG. 5 coincide with the numerals used in FIG. 1. The portion of the engine block shown in FIG. 5 is given the number 27 as it was in FIG. 1. The block has formed therein the combustion chamber 30 which is bounded on one side by the piston 31 within the cylinder 32 and on the other side by valve 33 disposed between combustion chamber 30 and air inlet 31. The configuration of FIG. 5 is that of a conventional V-8 over head valve 4-cycle motor car engine. In FIG. 5 the turbulence, indicated by the arrows A, induced at the top of the compression stroke by the conventional squish space 34 would circulate the compressed air in the direction of the arrows A, drawing the fuel jet out into a stratified volume allowing ignition by the spark passing between terminals 24 and 25. It is obvious that at light loads and with a corresponding short period of injection the fuel cannot be completely mixed with the air and hence be too lean a mixture to ignite. The stratified operation is inherent in the construction. No matter which direction the turbulence, or the orientation of the electrodes 24 and 25, ignition on the side of the fuel jet in the highly compressed air will be obtained.

Although the above description has been related to conventional 4-cycle engines, this invention is ideally adapted to the air scavenged two-cycle engine. Results can be achieved which cannot be achieved with the carburetor fed or with any type of injection engine that injects at low pressure, or with any type which is dependent upon a uniformly explosive mixture at the ignition instant and which would therefore require throttling of the air at light load, or which requires scavenging with a combustible mixture as is now almost universally done in two cycle gasoline transport vehicle engines.

In FIG. 6 a modified device constructed in accordance with this invention is shown. The device shown in FIG. 6 is utilized for injection alone without the application of electrodes, such as would be used on diesel or compression ignition engines. The device also has a modified spring or expandable control member.

The elements shown in FIG. 6 which are the same as components previously illustrated have been given the same numerals in FIG. 6 as previously with the addition of a "prime."

In this embodiment, stem 15' is set in a tubular member which is different in configuration than the tubular member shown in FIG. 1 and the member is not intended to be electrically conductive. The tubular member is indicated by the numeral 25 and has orifice 13' formed in its upper end 36. The upper portion of stem 15' is indicated by the numeral 14' and forms with orifice 13' a valve seating arrangement so that when stem 15' is in its uppermost position, as shown in FIG. 6, portion 14' blocks orifice 13' and when stem 15' is lowered the orifice is open. Stem 15' is provided with a blade 21' as was stem 15 in the first embodiment.

The numeral 37 represents the engine mountings for the injector.

In the embodiment shown in FIG. 6, the tubular member 35 is formed of metal, or possibly plastic, with integral bellows 37 formed in the lower end thereof. The bellows 37 and chamber 38 surrounded by the bellows 37 act as the control member. The chamber is formed to receive fuel under pressure from fuel line 19' and as the pressure builds up in chamber 38 the screw member 22' is moved downwardly together with stem 15' which is rigidly attached thereto at its lower end, thereby removing portion 14' from the valve seat and opening orifice 13'. As in the device of FIG. 1, a passage is achieved so that liquid fuel can be ejected.

The stem 15' is maintained in position in this device without the requirement of extremely tight clearances. This will minimize sticking by carbonization. Present injectors have high maintenance requirements. Also, the withdrawal of the valve 14' by means of a pressure actuated bellows element 37 rather than with a close fitting piston as is common practice today on such diesel engine injectors not only eliminates the need for close clearances, but also eliminates the need for lead off lines to carry back to the injection pump inlet the fuel oil which at present leaks past these close fitting pistons.

It should be noted that the construction disclosed in FIG. 6 could readily be utilized in a combined injector-igniter as shown in FIG. 1. Also, the control member construction utilized in the device of FIG. 1 could also be utilized in the device of FIG. 6.

In both of the devices disclosed the timing of the injection would depend upon the pressure build up from the pressure injection pump connected to the input line. The timing of the injection of fuel with respect to the sparking at the electrodes would necessarily have to be arranged in order that the sparking would occur at the proper moment upon injection of fuel and the spacing of the electrodes would be such that as the fuel is injected in an atomized state due to the swirl given it by the fins, the fuel will be ignited, except with design modification noted below.

With a minimum of modification the injector-igniter device disclosed herein could be utilized on the standard engines in use today and the injector and related injection pump could be used to replace the carburetor or fuel injecting devices used today.

The device could be designed to be inserted in the present spark plug hole or injector hole on existing machines after a slight enlargement.

The standard ignition system would be sufficient if care were taken in the timing of the spark and the injection but this might be difficult to maintain, but an ignition system in which a succession of sparks take place at each ignition time so as to give at least four to six igniting sparks or a continuous electric arc at the electrodes during a 20° to 30° rotation of the crankshaft of the engine at high speed and whose initiation would proceed the fuel injection slightly would permit the timing of combustion to be entirely by the injection pump as with present compression ignition engines. This is a preferred arrangement.

This could be achieved by re-timing the standard ignition distributor and breaker found in today's automotive vehicles and redesigning the ignition circuit so as to give ignition at and during the "make" position, rather than at the "break" point.

In such a rearrangement of the ignition system to give ignitions over a definite time, say through 20° to 30° or so of the crank shaft revolution and to start such ignition ahead of the fuel injection, the ionization of the air immediately around the electrodes and adjacent the fuel jet-air mixture might promote more effective and complete ignitions and combustion and is only possible in a stratified combustion engine of this basic type.

The ignition spark might be replaced with an electrically heated "glow wire" or catalytic ignition system in proper space relation to the jet of fuel and combustion air turbulence. For a further example, it might be expedient in order to secure full utilization of all the combustion air at maximum load to inject some fuel as a supplement directly into the intake air manifold.

Figure 3:
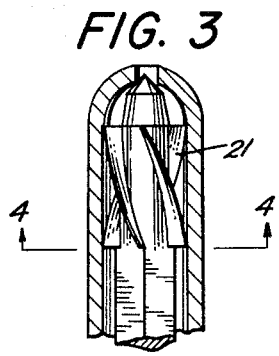
FIG. 3 is an enlarged segmentary sectional view of the nozzle portion of the combined injector-igniter device shown in FIG. 1.
Figure 2:
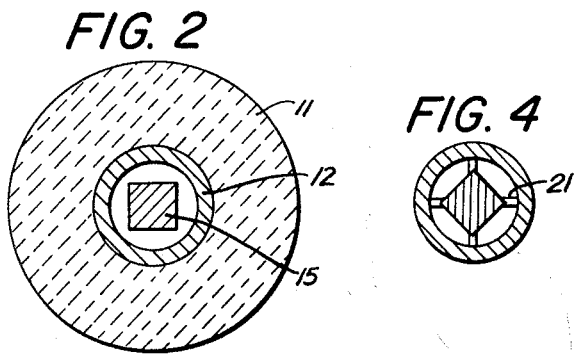
FIG. 2 is a cross-sectional view of the device shown in FIG. 1 taken along the line 2—2 in the direction of the arrows, as shown in FIG. 1.
Figure 4:
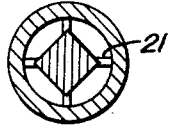
FIG. 4 is a cross-sectional view taken along the line 4—4 in the direction of the arrows, as shown in FIG. 3.

In FIGS. 7 and 8 an alternate form of stem is shown. These figures coincide with FIGS. 2 and 3 and like placed parts are given the same number followed by the letter "a." In the embodiment of FIGS. 7 and 8, the stem 15a within insulator 11a and conductor 12a is provided with a swedge portion at the end forming integral surfaces 21a functioning in the manner of blades 21. Such a construction allows the corners of body 15a to abut conductor 12a.

Thus, among others, the several objects in the invention, as specifically aforenoted, are achieved. Obviously, numerous changes in construction and rearrangement of parts might be resorted to without departing from the spirit of the invention as defined in the claims.

I claim:

1. In an internal combustion engine having a piston, a hollow cylinder and an air inlet valve mounted in the engine block forming a narrow combustion chamber in the cylinder head space, an elongated injector-igniter means fitted at its base in said engine block and having the igniter electrodes thereof extending into one side of the head space below said valve, the circulation of air in the head space occurring at right angles to the electrodes and to the longitudinal axis of said injector-igniter, said injector-igniter means having an inlet for fuel and having an axial passageway extending along its entire length in communication with said inlet, a valve stem mounted at one end of said injector-igniter means and extending along the length of said axial passageway, said stem being formed with vanes at its end adjacent said electrodes to impart a swirling motion to injected fuel.

2. The combination as claimed in claim 1 wherein said valve stem is rotatable.

3. The combination as claimed in claim 1 wherein an expandable elastic plastic plug is mounted at the end of said injector-igniter means which is remote from said electrodes, said expandable elastic plug being subjected to pressure for effecting movement of the valve stem to thereby adjust the fuel flow into said combustion chamber.

4. The combination as claimed in claim 3 wherein said plastic plug is transversely grooved for mounting said valve stem.

5. The combination as claimed in claim 3 wherein adjustable tensioning means is provided on the outside of said plug for additional adjustment.

References Cited in the file of this patent

UNITED STATES PATENTS

| | | |
|---|---|---|
| 1,310,970 | Stroud | July 22, 1919 |
| 1,593,023 | Knudsen | July 20, 1926 |
| 1,653,287 | Johnson | Dec. 20, 1927 |
| 2,008,803 | Stephan | July 23, 1935 |

FOREIGN PATENTS

| | | |
|---|---|---|
| 446,735 | Great Britain | May 5, 1936 |
| 640,927 | France | Apr. 7, 1928 |
| 1,047,341 | France | July 22, 1953 |
| 1,191,079 | France | Apr. 6, 1959 |
| 907,003 | Germany | Mar. 18, 1954 |